United States Patent [19]

Hureau et al.

[11] 4,303,609
[45] Dec. 1, 1981

[54] PROCESS FOR EXTRUDING A THERMOPLASTIC SHEATH IN THE FORM OF A TUBULAR FILM PROVIDED WITH PERFORATIONS AND DEVICE FOR CARRYING OUT THE PROCESS

[76] Inventors: Jacques Hureau, Saint-Remy-des-Monts, 72 600 Mamers; Jean-Claude Hureau, 56, rue du Leon, 78 310 Maurepas; Hubert Gaillard, 182, Avenue Rouget de Lisle, 94 400 Vitry, all of France

[21] Appl. No.: 107,835

[22] Filed: Dec. 28, 1979

[30] Foreign Application Priority Data

Jan. 3, 1978 [FR] France .................. 78 0089

[51] Int. Cl.³ .............................................. B29C 24/00
[52] U.S. Cl. ..................... 264/504; 264/565; 264/566; 264/DIG. 70; 425/72 R; 425/290; 425/326.1; 425/380; 425/381; 425/387.1; 425/DIG. 37
[58] Field of Search ....... 264/504, 565, 566, DIG. 70; 425/380, 381, 72 R, 290, 326.1, 387.1, DIG. 37

[56] References Cited

U.S. PATENT DOCUMENTS

| | | | |
|---|---|---|---|
| 2,834,983 | 5/1958 | Norton | 425/DIG. 37 |
| 3,038,198 | 6/1962 | Schaar | 425/387.1 |
| 3,054,148 | 9/1962 | Zimmerli | 425/DIG. 37 |
| 3,583,034 | 6/1971 | Colombo | 425/72 R |
| 3,810,725 | 5/1974 | Trub et al. | 425/72 R |
| 3,841,815 | 10/1974 | Labarre | 425/290 |
| 3,947,174 | 3/1976 | Hureau et al. | 425/380 |
| 4,038,008 | 7/1977 | Larsen | 425/290 |

FOREIGN PATENT DOCUMENTS

| | | | |
|---|---|---|---|
| 672735 | 10/1963 | Canada | 264/569 |
| 2144606 | 2/1973 | France | 425/290 |

Primary Examiner—Jeffery R. Thurlow
Attorney, Agent, or Firm—Fisher, Christen & Sabol

[57] ABSTRACT

The present invention relates to a process for extruding a thermoplastic sheath in the form of a tubular film provided with perforations and to a device for carrying out the process, according to which the extruded film passes over a skirt through which are blown jets of hot air provoking the perforation and formation of openings in the film; in the areas where the film is not to be perforated, air jets are also blown through channels of smaller width, therefore with a reduced pressure, so that the jets do not provoke the perforation of the film but form an air-cushion facilitating the flow of the film on the skirt; the channels are supplied from a pneumatic chamber with interposition of a rotary distributor formed by a ring made of graphite or self-lubricating material. The invention is applicable to the manufacture of partially perforated tubular films with a view to making packings.

13 Claims, 5 Drawing Figures

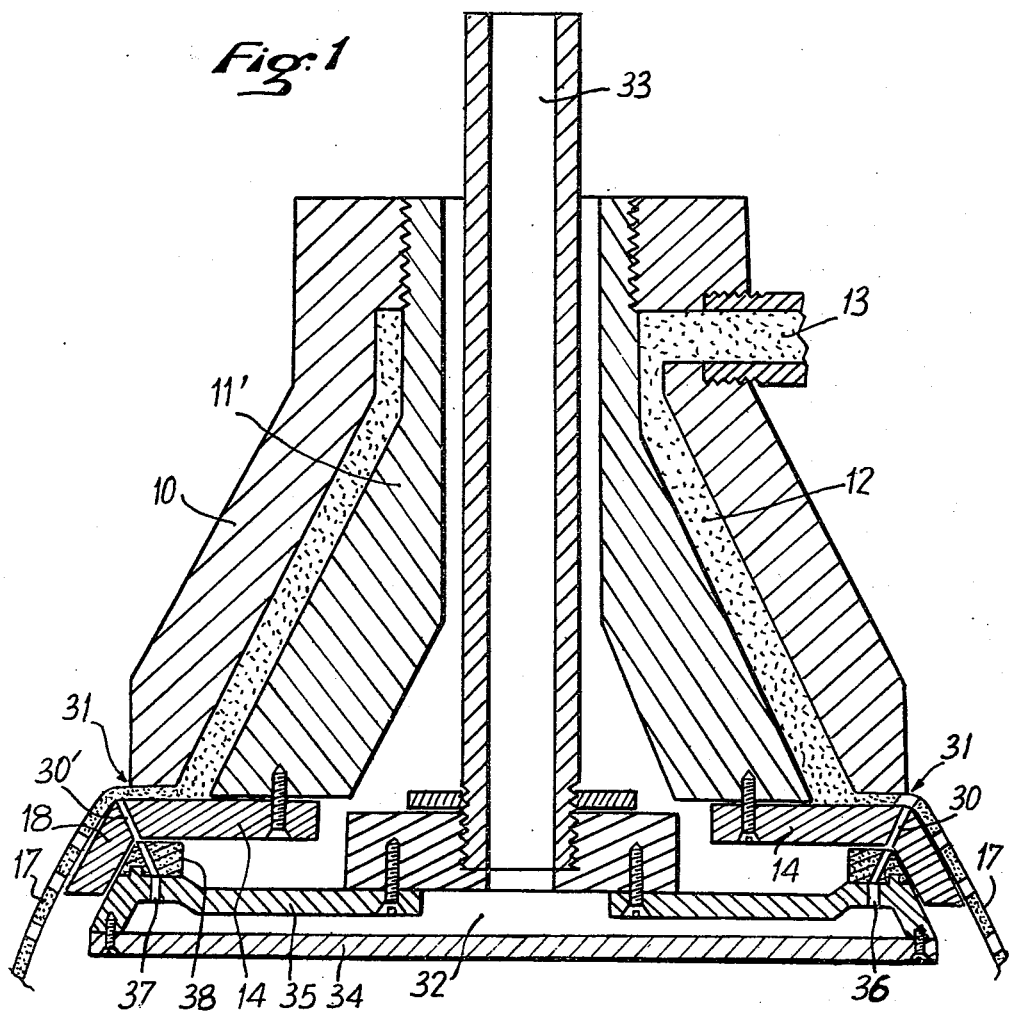
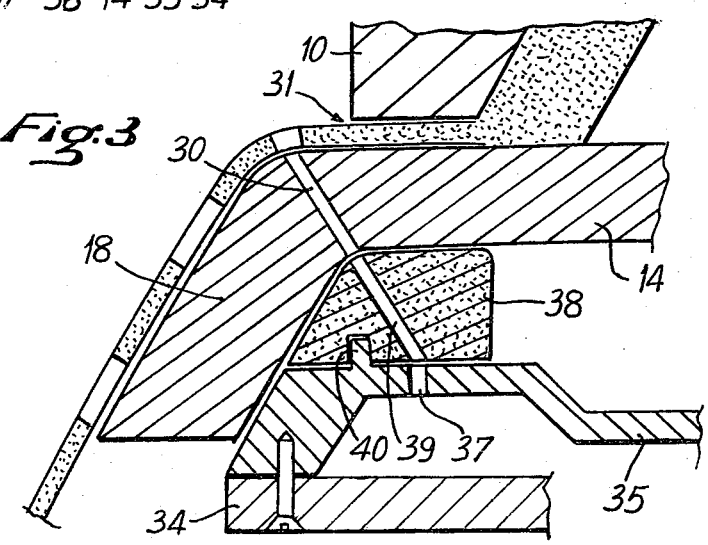

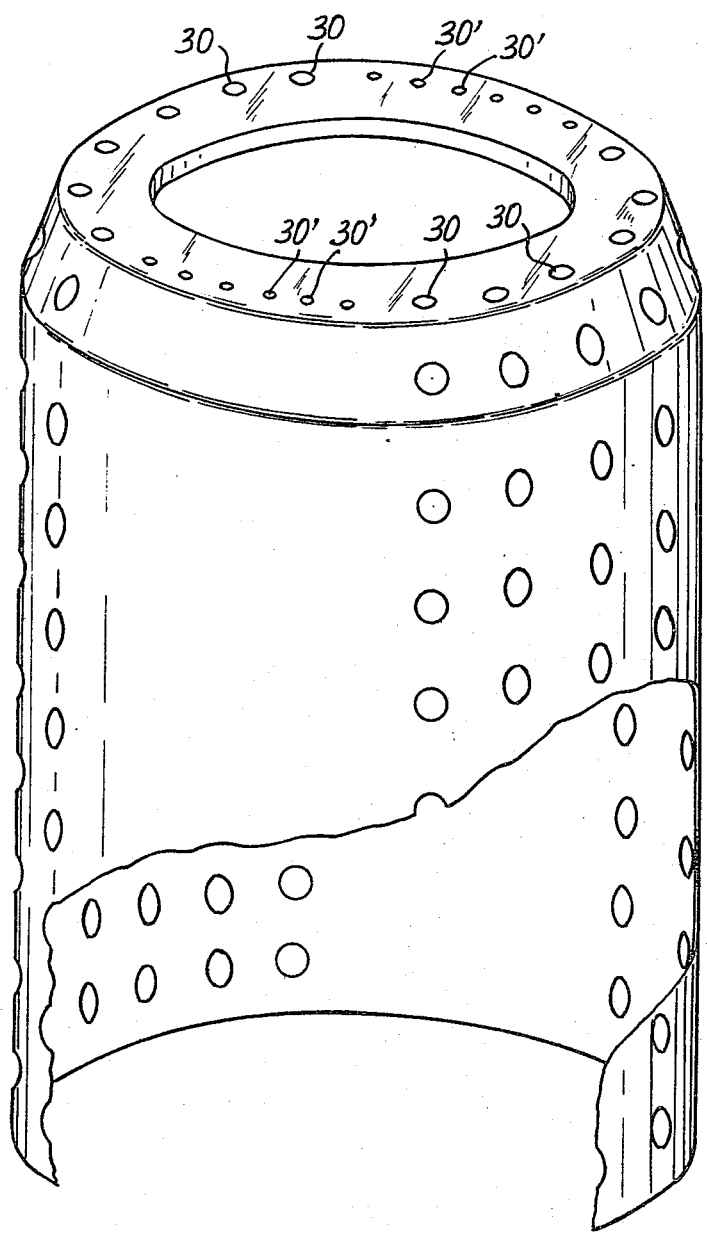

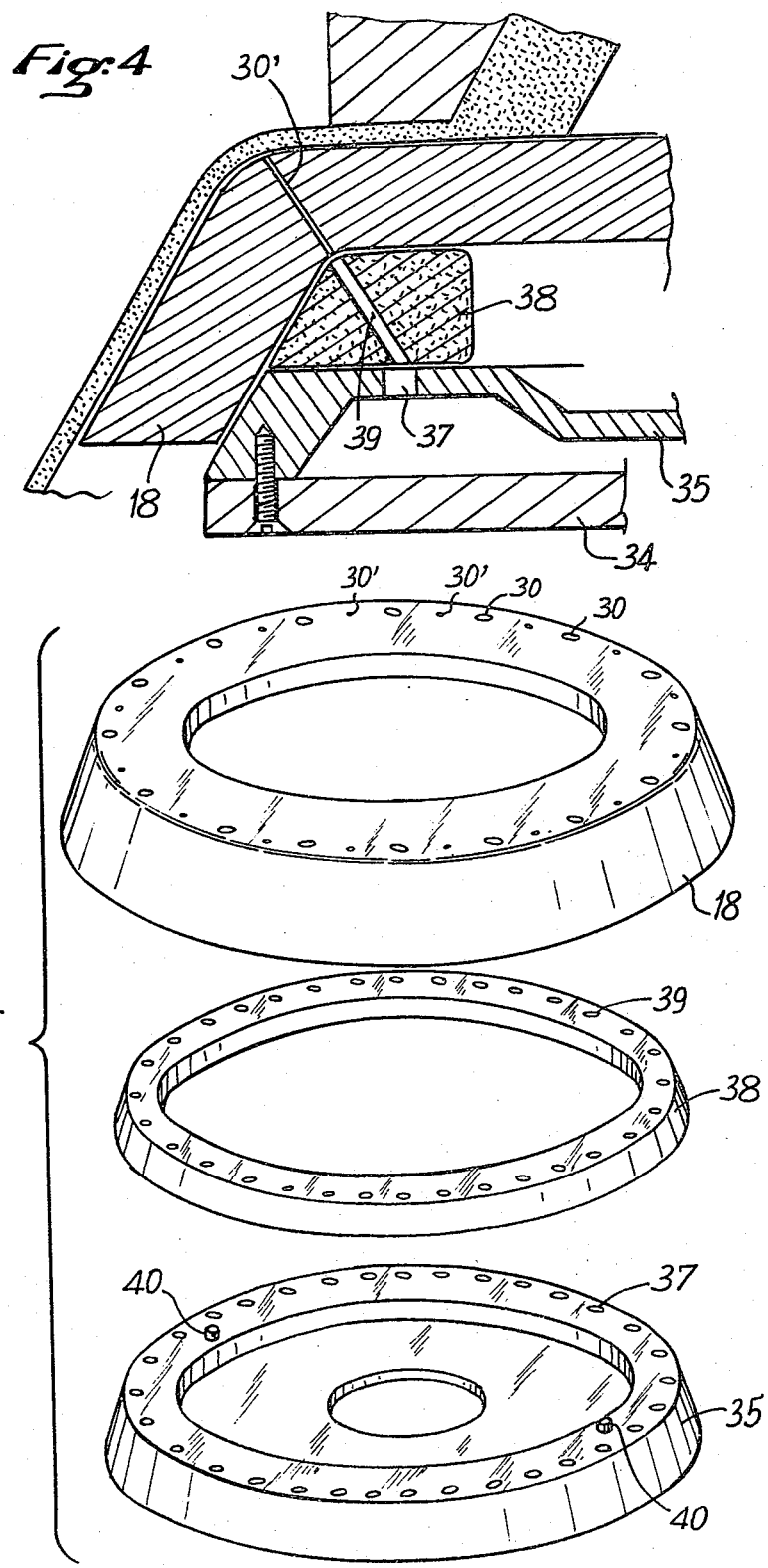

PROCESS FOR EXTRUDING A THERMOPLASTIC SHEATH IN THE FORM OF A TUBULAR FILM PROVIDED WITH PERFORATIONS AND DEVICE FOR CARRYING OUT THE PROCESS

The present invention relates to a process, and a device for carrying out this process, for extruding a sheath of a synthetic material, and more particularly a thermoplastic material, in the form of a thin film of tubular structure. The invention is more particularly intended for the manufacture of such a tubular film having a wall perforated either completely or at least over a part of said wall.

The extrusion of thin tubular films from a synthetic, particularly thermoplastic material enables bags, containers, packings or the like to be made by sectioning and subsequent transverse heat-welding; the use of said bags and the like is extremely wide-spread and the consumption thereof is high, particularly where the distribution of expendable articles is concerned.

The extrusion of such tubular films is effected from circular extrusion dies, supplied with material in the thermoplastic state by an extruding machine, and yielding the tube of synthetic material then subjected to cooling.

French Pat. No. 72 37186 and U.S. Pat. No. 3,947,174 in particular discloses processes and devices for extruding tubular sheaths of lacunary structure, by pneumatic perforation of a film leaving the extruding machine, the film passing over a truncated skirt provided with channels through which hot air is blown to provoke the perforations on the tubular films.

However, it is desirable in numerous cases to produce a sheath of synthetic material comprising lacunary areas (provided with perforations) alternating with areas forming a continuous surface.

Such a sheath will advantageously be used for making perforated bags or the like thus allowing the aeration of the product contained therein; furthermore, the presence of transverse or longitudinal areas provided on the sheath and offering a continuous surface will make it possible for example to produce reinforced zones adapted to constitute handles for the bag; such areas may also be provided to receive a print, allowing advertizing of or information on the product contained therein. These continuous areas advantageously contribute to reinforcing the mechanical strength of the whole bag or container.

Now, experience has shown that the passage of the parts of the sheath forming a continuous surface wall, over the truncated skirt, presents difficulties; in fact, the material coming straight out of the die and still in the soft state, adheres to the walls of the shaping device and therefore does not allow the regular advance of the sheath.

It is an object of the invention to remedy these drawbacks and to enable a sheath to be extruded in the form of a tubular film comprising perforated areas alternating with areas of continuous surface.

The invention relates to a process for the extrusion of a sheath of thermoplastic material forming a tubular film and comprisisng perforations, of the type in which the tubular film still in the plastic state is guided over a truncated skirt forming a shaper for expanding said tubular film and is subjected to jets of air to perforate the film, wherein one part of the air jets, or first jets, is provided with physical characteristics, such as pressure or rate of flow, allowing the perforation of the film, whereas another part of the air jets, or second jets, is provided with physical characteristics less than those of said first jets and being unable to perforate the film, the air blown by these second jets thus forming an air-cushion in the interface between the film and the outer wall of the skirt, thus allowing the continuous film to flow along this wall, the first jets, constituting perforation jets, being blown in the areas of the film intended to be perforated, the second jets, constituting air-cushion jets, being blown into the areas of the film intended to remain solid.

The invention also relates to a device for carrying out said process and for extrusion of a sheath of thermoplastic material comprising areas with perforations alternating with areas of continuous surface and said device comprises:—a downwardly directed extrusion head adapted to extrude a downwardly drawn tubular film;—a truncated skirt forming shaper for expanding said tubular film and extending at the periphery of said extrusion head;—a source of pressurized air;—a chamber supplied with pressurized air, said chamber being contained inside said skirt;—communication means for conducting pressurized air from said source to said chamber;—first and second channel means passing through the wall of said skirt and communicating with said chamber and opening out on the outer wall of said skirt immediately downstream of the extrusion head;—a rotating distributor located inside said chamber and adapted to obturate said channel means intermittently; wherein said first channel means are provided with a width greater than that of the second channel means and said first channel means, forming perforated channels, are so adapted as to blow an air jet strong enough to perforate the film, whilst the second channel means, forming air-cushion channels, are adapted to blow an air jet of mechanical characteristics less than those of the first channel means (perforation channels) and thus unable to perforate the film, the air blown by said second channel means (air-cushion channels) forming an air-cushion between the film and the wall of the skirt facilitating the flow of the continuous surface of the film on the skirt.

The invention will be more readily understood on reading the following description with reference to the accompanying drawings, in which:

FIG. 1 shows a view of the die and extrusion head in which an inner pneumatic chamber is in communication with the surface of the skirt on which the tubular film passes, by a device for intermittently distributing fine streams of air, to obturate the film.

FIG. 2 shows a view in perspective of a skirt provided with first channel means (perforation channels) and second channel means (air-cusion channels) yielding a partially perforated film.

FIG. 3 shows an enlarged view of a detail of the skirt according to FIG. 1, at the level of a perforation channel.

FIG. 4 shows an enlarged view of a detail of the skirt according to FIG. 1, at the level of an air-cushion channel.

FIG. 5 shows an exploded view in perspective of a skirt and its distributor according to the invention.

Referring now to the drawings, FIG. 1 shows an extrusion head according to a first embodiment of the invention.

The extrusion head here comprises an outer element 10 associated with an inner core 11, both generally truncated in form and separated so as to leave a chamber 12 therebetween, supplied at 13 with synthetic material in the plastic or soft state by an extruding or plasticizing machine (not shown in the drawings).

The central core 11 comprises at its lower end a ring 14 of which the upper face 15 defines with the lower edge 16 of the element 10 the circular die allowing the extrusion, by the passage of a film of synthetic material forming the sheath 17.

The extrusion ring 14 belonging to the inner core is extended at its periphery by a truncated wall or skirt 18 on which the sheath film 17 slides, this skirt 18 constitutes a shaper for expanding the sheath in the plastic state when it leaves the extrusion die.

Thus, the ring 14 constituting the central core of the die comprises channels 30, 30' opening immediately downstream of the slot 31 forming extrusion die and these channels 30, 30' are supplied with pressurized air and taken to the suitable temperature by a distribution device located beneath the ring 14 and inside the skirt 18 shaping the extruded sheath.

This distribution device comprises a chamber 32 communicating via pipe 33 with a source of compressed air (not shown in the drawings) with means for adjusting temperature and pressure of the air.

The chamber 32 is defined by the lower disc 34 and the annular plate 35, the whole being fast with the pipe 33; this latter is driven in rotation by a device (not shown in the drawings).

On its periphery, the annular plate 35 comprises channels for the passage of compressed air towards the channels 30, 30' of the extrusion ring 14.

The channels 36, 37 of the plate 35, due to the regular rotation of this plate, are brought at regular intervals in register with the channels 30, 30' and thus allow the intermittent supply of the latter during the period of register.

However, experiments and test which Applicants have carried out have shown that it was not possible to obtain a regular and reliable functioning of the distribution plate 35 in tight contact with the ring 14.

In fact, the ring 14 must be maintained at a sufficiently high temperature (of the order of 200° to 250° C.) so as to allow the flow of the molten and soft synthetic material without premature cooling which would risk obturating the die or extrusion slot 31.

The contact of two rotating metallic surfaces on each other and at a high temperature cannot be prolonged without causing a rapid degradation of the state of one of the two surfaces or of the two, despite the special treatment that these surfaces may undergo.

The invention remedies this drawback with efficiency and solves this problem by using an intermediate ring 38 made of solid, self-lubricating material with a low coefficient of friction.

Preferably, and in the present example, the ring 38 is made of graphite.

However, this ring could also be made of a synthetic material such as a fluorinated resin or a polyimide resin.

The graphite ring 38 has a series of channels 39 passing therethrough, each channel 39 coming into register with a lower circular channel passing through the circular plate 35 and extending this channel 36 or 37.

The correct positioning of the graphite ring 38 is obtained by a system of studs 40 provided on the circular plate 35 and penetrating in a housing provided on the lower face of the graphite ring 38; the correct positioning of the ring on the plate and the strict register of the channels 39 of the graphite ring 38 with respect to the channels 37 of the plate are thus ensured. Under these conditions, the assembly constituted by the plate 35 and its graphite ring and the lower disc 34 and forming the distribution chamber may be driven regularly in rotation by bearing in the lower angle of the ring 14 constituting the central core of the die without causing any problem of deterioration of the materials in contact.

To this end, the graphite ring acts as seal between the chamber 32 and the inner face of the ring 14 from which the channels 30 for blowing thin streams of air leave.

This ring ensures a perfect, reliable seal, this making it possible to obtain the regular distribution of the air streams blown through the ring 14.

In addition to its role of seal, this graphite ring also acts as lubricating element allowing the permanent self-lubrication of the two rotating surfaces in contact.

Finally, the graphite ring acts as screen allowing a thermal insulation between the ring 14 forming the central inner core of the die and the compressed air distribution chamber 32, thus allowing the holding of these two elements cooperating to ensure the regular distribution of the air streams through the channels 30.

According to the invention, the channels disposed on the periphery of the ring 14 or on the skirt 18 are provided to be of two types.

A series of first channels is provided with characteristics such that the air jets distributed through these channels pneumatically perforate the still soft extruded film; these first channels are therefore perforation channels and are adapted to make openings at least in certain areas of the film in order to create aerated zones, for example to obtain packings where the products are to be ventilated.

The ring 14 forming the central core of the die or the skirt 18 also comprises a series of second channels of which the characteristics are such that the air jets distributed through these second channels are not sufficient to ensure the perforation of the extruded film and these air jets are intended to form an air cushion between the film in the soft state and the outer surface of the skirt 18.

By suitably disposing the first channels (or perforation channels) and the second channels (or air-cushion forming channels) on the periphery of the central extrusion ring 14 or on the skirt 18 and by advantageously adjusting the rate of distribution of the air jets in these channels, perforated areas may be formed on the surface of the extruded film, alternating with areas in which the film offers a continuous surface.

Packings, bags and the like may thus be produced, comprising a lacunary structure and consequently allowing the product to be ventilated, the continuous areas offering a support for information or advertizing.

According to another development of the invention, a ring 14 forming inner extrusion core extended by a skirt 18 of standard design, as shown in FIG. 5, is used.

This ring extended on its periphery by the shaping skirt 18 comprises, near its peripheral edge, the opening of the perforation and air cushion channels respectively.

It is seen that the channels 30 for perforating the film are provided with dimensions clearly greater than the air-cushion channels; for greater clarity of the drawings, the openings of the channels have been shown magnified and not to scale.

According to FIG. 4, the circular plate 35 provided with its graphite ring 38 are housed in the inner space of this ring 14.

The ring 14 respectively comprises the first channels 30 and the second channels 30' disposed on its periphery and distributed at regular intervals.

When it is desired to make a film having a desired distribution of perforated and continuous areas respectively, the perforation channels 30 are obturated in the areas opposite the areas of the film where the surface must be continuous and not perforated; under these conditions, the perforation channels 30 are made inactive and the extruded film opposite these channels does not undergo the effect of perforation; on the contrary, the channels 30', or air-cushion channels, are active and allow the film to slide on the shaping skirt 18'. Obturation means such as wax may be used which allow the removal thereof, for instance by heat treatment. Wax will be chosen which melts at a temperature higher than that of the skirt under operating conditions. Various other removable obturating means may be used, chosen from moldable substances whose melting point is higher than the temperature of the skirt. Removable mechanical obturating means such as screws or the like may also be inserted in the channels.

It is understood that whenever the location and/or number of the perforations desired on the film are modified, for extrusion of a further sheath, it is easy to adapt the perforation channels accordingly, by re-activating those channels which were previously obturated (by removal of the obturating means) and/or by obturating those channels which were previously open and active.

It is also to be emphasized that the width of the first and second channels respectively is not critical; what is important is to maintain a given ratio between the width of the first channels and the width of the second channels. According to tests carried out by Applicants, this ratio must be between 1.5 and 3 and preferably close to 2.

The pressure inside the chamber is not critical either and depends on the width of the channels. Provided that the specified ratio between first and second channels is respected, it is easy for the man skilled in the art to determine, by trial and error, the proper pressure for which the first channels perforate the film, whereas the second channels do not. When said ratio is around 2, it is even possible to regulate the pressure so as to obtain perforations of the desired size, without affecting the air-cushion channels which will always blow the air necessary for the air-cushion effect without perforating the film.

It is also possible to adjust the temperature of the air, depending on the pressure, in order to attain the suitable physical characteristics of the air jets such that the first channels will perforate the film and the second channels will not.

What is claimed is:

1. Process for the extrusion of a sheath of thermoplastic material to form a tubular film provided with perforations extending along the length of the sheath and over at least a first portion of the circumferential area, at least one other circumferential area remaining unperforated, comprising the steps of:
    extruding a tubular film through a circular die;
    guiding said tubular film while in the plastic state over a truncated skirt forming a shaper to expand the diameter of the tubular film;
    subjecting said film in said plastic state to intermittently blown first jets of air having a physical characteristic to intermittently perforate the film over said first portion of the area;
    while subjecting said film to second air-cushioning jets of air having a physical characteristic incapable of perforating said film to enable the continuous flow of said film over said truncated skirt.

2. Process of claim 1, wherein the physical characteristic of said air jets is the volume of air comprising said jets.

3. Process of claim 1, wherein the physical characteristic of said air jets is the temperature of air comprising said jets.

4. Process of claim 1, wherein the air pressure supplied to all of said air jets is approximately uniform, the diameters of the first jets being greater than the diameters of the second jets.

5. Process of claim 1, wherein said truncated skirt is provided with circularly arranged spaced passages through which are blown said first and second jets of air for perforating and air-cushioning said film and obturating certain of the passages for said first jets with removable obturating means to prevent perforating of the film in the area adjacent said obturated passages.

6. Device for extrusion of a sheath of thermoplastic material in the form of a tubular film comprising longitudinally extending areas provided with perforations alternating with longitudinally extending areas of continuous surface, said device comprising:
    a downwardly directed extrusion head adapted to extrude a downwardly drawn tubular film;
    a truncated skirt forming a shaper for expanding said tubular film and extending at the periphery of said extrusion head;
    a source of pressurized air;
    a chamber supplied with pressurized air, said chamber being contained inside said skirt;
    communication means for conducting pressurized air from said source to said chamber;
    first and second channel means passing through the wall of said skirt and communicating with said chamber and opening out on the outer wall of said skirt immediately downstream of the extrusion head;
    a rotating distributor located inside said chamber and adapted to obturate said channel means intermittently;
and wherein the width of said first channel means are greater than the width of the second channel means and said first channel means, forming perforation channels, are so adapted as to blow an air jet strong enough to perforate the film, whilst the second channel means, forming air-cushion channels, are adapted to blow an air jet of mechanical characteristics less than those of the first channel means and thus are unable to perforate the film, the air blown by said second channel means forming an air-cushion between the film and the wall of the skirt facilitating the flow of the film on the skirt.

7. The device of claim 6, wherein the ratio of the width of the first channel means, with respect to the width of the second channel means is between 1.5 and 3.

8. The device of claim 6, wherein the ratio of the width of the first channel means with respect to the width of the second channel means is close to 2.

9. The device of claim 6, wherein the distributor comprises a distribution ring provided with circularly spaced perforations located against the inner wall of said skirt, and rotary drive means to rotate said distributor so that the perforations are adapted to come at regular intervals into register with the first and second channel means, the ring thus alternately obturating said first channel means and said second channel means and allowing their intermittent communication for a short instant with the chamber, thus allowing the blowing of a thin stream of air onto the film, said ring being made of self-lubricating solid material with low coefficient of friction.

10. The device of claim 6, wherein the distributor is constituted by a distribution ring made of graphite and mounted on a support disc.

11. The device of claim 9, wherein the distributor is constituted by a distribution ring made of a synthetic resin such as fluorinated resin or polyimide resin.

12. The device of claim 9, wherein the distribution ring comprises a bevelled outer edge applied against the inner wall of the skirt, the two faces being in contact along a frustum of a cone thus producing a self-centering device.

13. The device of claim 6, wherein said first channel means alternate with said second channel means, said skirt enabling said first channel means to be selectively obturated by removable obturation means in those areas where it is desired for the film to have a continuous surface.

* * * * *